United States Patent [19]

Morel

[11] 4,290,536
[45] Sep. 22, 1981

[54] CLOSURE FOR SEALING OPENINGS IN PANELS

[75] Inventor: Henri Morel, Maule, France

[73] Assignee: ITW de France, Beauchamp, France

[21] Appl. No.: 134,713

[22] Filed: Mar. 27, 1980

[30] Foreign Application Priority Data

Mar. 28, 1979 [FR] France ............................... 79 07819

[51] Int. Cl.³ .............................................. B65D 41/00
[52] U.S. Cl. ................................... 220/359; 220/307; 220/308; 220/DIG. 19
[58] Field of Search ............... 220/307, 308, 320, 323, 220/352, 359, DIG. 19; 215/294, 358

[56] References Cited

U.S. PATENT DOCUMENTS 3,851,794 12/1974 Hehl ................................... 220/308
3,990,604 11/1976 Barnett et al. ....................... 220/307

Primary Examiner—George T. Hall

Attorney, Agent, or Firm—J. R. Halvorsen; T. W. Buckman

[57] ABSTRACT

A sealing plug device for fitting holes, orifices, and openings formed in panels, of the dish plug type having a bottom portion, a lateral wall, engagement means on said wall, an elastic collar to be applied against the forward edge of the hole and thermofusible means disposed between the panel and said elastic collar; said sealing plug device comprises application or collar means having in particular a peripheral channel, thermofusible means having in particular a peripheral cord liable to be crushed and melted between said channel and panel within the space that may occur between said sealing plug device and the hole to be fitted in, so that after cooling such device becomes perfectly integral with said panel in said hole due to solidification of the thermofusible means to be exact required shape without any loss of material whatever the planarity and position in space of said panel may be.

3 Claims, 4 Drawing Figures

CLOSURE FOR SEALING OPENINGS IN PANELS

BACKGROUND OF THE INVENTION

This invention relates to a sealing hole plug device for use in complementary holes formed in deformed surface panels generally made of sheet metal, superimposed panels having axially aligned apertures therein and the like. The angular disposition in ambient space of such panels can differ in many ways.

Such holes are required for many reasons (paint discharge holes access holes for various mountings and so on) and must be perfectly filled after fulfillment of their function.

This invention solves this problem in a more efficient way than any solution proposed heretofore.

Plugging devices are known which comprise a dish shaped plug having a bottom portion, a cylindrical wall, means for engaging said wall and an annular collar or head to be applied against the forward surface of the panel adjacent the edge of the hole.

Plugs of this type are known having a bottom comprising a convex portion extending toward the head thereof while a further improvement thereof provides for a conical form of the bottom portion of the wall surrounding the convex bottom portion. Such a plug made from elastic plastic material also comprises an annular projecting engaging bead extending laterally from the wall such that the plug is mounted in the hole without any possibility of disengagement thereof. Furthermore, it has been suggested to improve tightness by means of a resilient collar or head that is slightly inclined from the inward to the outward direction and toward the panel, i.e. of a conical form such that it can engage against the surface of the panel while deforming elastically and exerting in axially directed pressure when the plug is fitted in.

Moreover, it is known to lay a heat fusible sticking sheet of plastic material between the collar and the rim of the panel hole before insertion of the plug into the latter. The plug is then pushed into the hole and finally the sheet compressed between the collar and the panel is exposed to a sufficient temperature for melting the heat fusible sheet.

However, in certain applications, this type of plug does not provide the required sealing.

SUMMARY OF INVENTIONS

This invention relates to a sealing plug device characterized in that it includes a resilient head or collar means and thermofusible means, with the head means having a peripheral groove or channel and said thermofusible means having a peripheral bead or cord that can be crushed when melted between said channel and the panel. The thermalfusible means when melted is generally captured by the head and its associated peripheral groove and further including the space between the plug device and the hole to be obstructed so that after cooling, the plug device becomes perfectly secured to the panel and sealed in the hole after hardening of the thermofusible means to the requisite accurate shape without any loss of material whatever the planarity and position in ambient space of said panel.

Other characteristics and advantages of this invention will appear from the following description that refers to the attached drawings on which:

DETAILED SPECIFICATION

Figure 1:
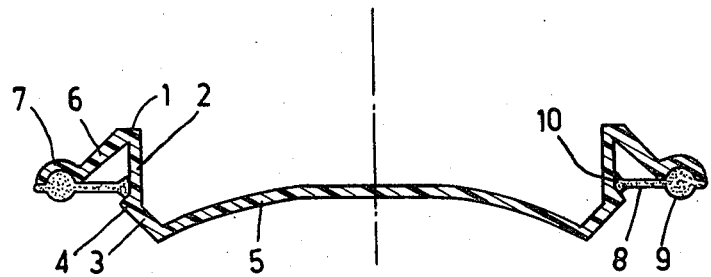
FIG. 1 is a cross sectional view of the plugging device assembly according to the invention.
Figure 4:
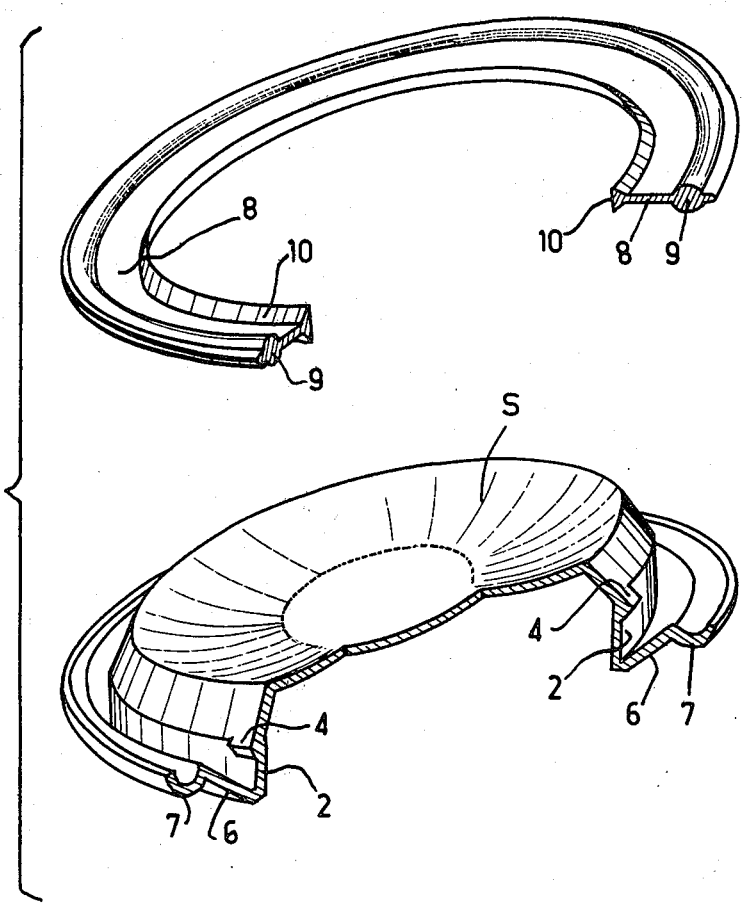
FIG. 4 is a perspective view at enlarged scale showing separately the two parts which constitute the device according to the invention.

In the preferred form of embodiment shown the sealing plug device according to the invention consists of two parts (FIGS. 1 and 4):

a supple plug 1 made of a plastic material comprising preferably a plug forming portion or cylindrical hollow barrel 2, an entry bevelled portion 3, clipping portions 4 and a concave bottom 5, the concavity of which is directed to the hole to be obturated. Furthermore, it should also comprise a resilient circular head or crown portion 6 wth a groove or channel 7 on the outer peripheral edge thereof;

a thermofusible ring 8 with an outer bead or cord 9 and inner circular lips 10.

Before use the thermofusible ring 8 is mounted on the plug 1 by snapping it into place around wall (2) and axially above the clipping portions or shoulders 4 which hold it in place.

Figure 2:
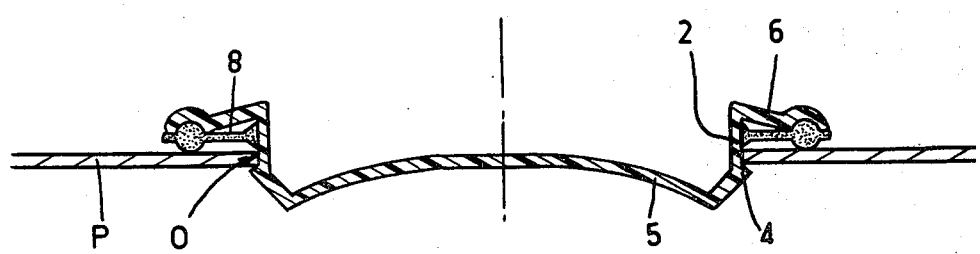
FIG. 2 is another cross sectional view of such assembly inserted into an orifice formed in the panel.

The basic principle of use of the plug device is the following (FIG. 2).

The plug device 1 provided with its thermofusible ring 8 is introduced in the complementary aperture O of panel P generally made of sheet material.

The clipping portions 4 hook on the rear non-visible face of the panel P thereby causing the thermofusible ring 8 to flatten between the elastic circular head or crown 6, provided with its groove or channel 7, and the visible face of the panel P whereas the concave bottom 5 when partially flattened by a clacker action pushes the wall or barrel (2) laterally to engage to the periphery of the aperture O.

Figure 3:
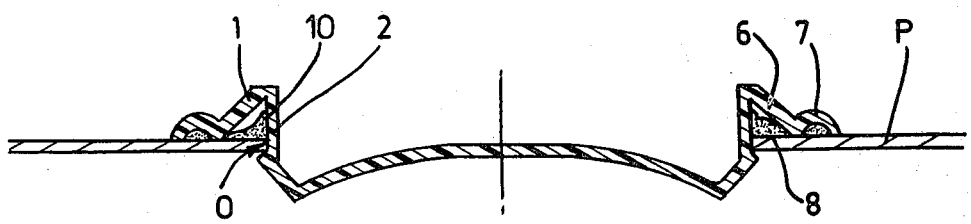
FIG. 3 is a view similar to FIG. 2 in which the plugging device is finally mounted in the panel hole.

The assembly is then transferred into a bake zone, not shown, at a predetermined temperature (FIG. 3) so that the thermofusible bead (9) of ring 8 melts in the channel 7 and the circular resilient head 6 which is held in a state of permanent pressure against panel P provokes imprisonment of the molten material in the available free space. Lips 10 melt so as to flow into and fill in the space between the cylindrical barrel shaped hole 2 and the aperture O thereby obtaining perfect sealing.

Since the plug device 1 is made of a selected plastic material it follows any possible configuration or deformation of the panel P by virtue of the resilient head 6 provided with its groove or channel 7. The thermofusible ring 8 melts so as to fill all empty spaces including any space between the wall 2 and the aperture O of panel P and also fills such additional spaces that are not distributed regularly because of any intentional or unintentional deformations.

After cooling the plug device 1 becomes perfectly integral with the panel P and the hole O due to solidification of the thermofusible ring 8 to the exact shape including possible deformations thereof. There is little or no loss of material because of the channel 7 which is resiliently urged by head (6) against the panel regardless of what angle the inclination of the panel P may be disposed.

It will be understood that this invention was only described and represented in the light of a preferred circular embodiment and that equivalent parts of complementary configuration can be substituted for its constitutive elements without departing from its scope as covered by the appended claims.

I claim:

1. A one piece plastic sealing plug device adapted to close and seal a complimentary aperture formed in panels, said plug being of the dished type having a bottom portion, a lateral encircling wall, external engagement means on said wall, a resilient head to be applied against the forward surface of the panel adjacent the edge of the aperture and ringlike thermofusible means disposed between the panel and said resilient head, said sealing plug device being characterized in that it includes resilient head means having a peripheral channel, said thermofusible means including a peripheral bead portion adapted to be captured within said resiliently urged channel and to be melted between said channel and panel upon application of an elevated temperature, whereby it is substantially retained under said head and caused to flow in its melted condition within the space that may occur between said sealing plug device and the aperture it is fitted in, whereby after colling such device becomes perfectly integral with said panel in said hole due to solidification of the thermofusible meas to the exact required shape without any loss of material regardless of the planarity and angular position in space said panel may assume.

2. A sealing plug device according to claim 1 characterized in that the thermofusible means comprises a ring bordered on its outer perimeter by said peripheral bead and on its inner perephery by a lip (10).

3. A sealing plug device according to claim 1 characterized in that the lateral wall is a hollow cylindrical barrel and the bottom portion is concave with the convaity directed toward the aperture to be closed and said concave bottom biasing said barrel into aggressive engagement with the peripheral edge of the hole.

* * * * *